US00RE48575E

(19) United States
(12) Reissued Patent
Weiss et al.

(10) Patent Number: US RE48,575 E
(45) **Date of Reissued Patent: *Jun. 1, 2021**

(54) DISPLAY DEVICE, IN PARTICULAR FOR COOKTOPS

(71) Applicant: SCHOTT AG, Mainz (DE)

(72) Inventors: Evelin Weiss, Mainz (DE); Gerold Ohl, Sulzheim (DE); Thomas Zenker, Nieder-Olm (DE); Martin Taplan, Mainz (DE)

(73) Assignee: SCHOTT AG, Mainz (DE)

( * ) Notice: This patent is subject to a terminal disclaimer.

(21) Appl. No.: 16/169,679

(22) Filed: Oct. 24, 2018

Related U.S. Patent Documents

Reissue of:
(64) Patent No.: 9,483,983
Issued: Nov. 1, 2016
Appl. No.: 13/993,033
PCT Filed: Dec. 2, 2011
PCT No.: PCT/EP2011/071631
§ 371 (c)(1),
(2) Date: Sep. 3, 2013
PCT Pub. No.: WO2012/076414
PCT Pub. Date: Jun. 14, 2012

(30) Foreign Application Priority Data

Dec. 8, 2010 (DE) ..... 102010061122.0
Jun. 6, 2011 (DE) ..... 102010050873.2

(51) Int. Cl.
*H05B 6/12* (2006.01)
*F24C 15/10* (2006.01)
(Continued)

(52) U.S. Cl.
CPC ..... *G09G 3/36* (2013.01); *F24C 7/082* (2013.01); *F24C 7/083* (2013.01); *F24C 15/10* (2013.01);
(Continued)

(58) Field of Classification Search
CPC ..... F24C 7/082; F24C 7/083; F24C 15/10; F24C 15/102; G09F 23/0058; G09F 23/04; G02B 27/026; H05B 6/1218; H05B 3/746
See application file for complete search history.

(56) References Cited

U.S. PATENT DOCUMENTS 5,491,115 A 2/1996 Pfitzenmaier et al.
9,371,969 B2 * 6/2016 Zenker ..... H05B 6/1218
(Continued)

FOREIGN PATENT DOCUMENTS

DE 3814354 11/1989
DE 4007971 9/1991
(Continued)

OTHER PUBLICATIONS

English Translation of International Search Report dated Feb. 22, 2012 corresponding to International Patent Application No. PCT/EP2011/071631, 3 pages.
(Continued)

*Primary Examiner* — James A Menefee
(74) *Attorney, Agent, or Firm* — Ohlandt, Greeley, Ruggiero & Perle, L.L.P.

(57) ABSTRACT

A display device in particular for cooktops is provide that has a glass ceramic with a front side and a back side and a lamp arranged in the area of the back side. The display device further includes an optical compensation filter arranged between the front side and the lamp so as to implement any color impressions easily and inexpensively and in a preselectable manner.

19 Claims, 9 Drawing Sheets

(51) Int. Cl.

| | |
|---|---|
| ***G09F 23/00*** | (2006.01) |
| ***H05B 3/74*** | (2006.01) |
| ***F24C 7/08*** | (2006.01) |
| ***G09G 3/36*** | (2006.01) |
| ***G02B 5/20*** | (2006.01) |
| ***G02B 27/02*** | (2006.01) |
| ***G09F 9/33*** | (2006.01) |

(52) U.S. Cl.

CPC ..... *F24C 15/102* (2013.01); *G02B 5/20* (2013.01); *G02B 27/026* (2013.01); *G09F 9/33* (2013.01); *G09F 23/0058* (2013.01); *H05B 3/746* (2013.01); *H05B 6/1218* (2013.01)

(56) References Cited

U.S. PATENT DOCUMENTS

| | | | | |
|---|---|---|---|---|
| 2005/0252754 | A1 | 11/2005 | Arnold | |
| 2006/0081773 | A1 | 4/2006 | Rains, Jr. et al. | |
| 2007/0108184 | A1 | 5/2007 | Imamoto et al. | |
| 2007/0295711 | A1 | 12/2007 | Striegler et al. | |
| 2008/0207424 | A1 | 8/2008 | Aitken et al. | |
| 2010/0219176 | A1* | 9/2010 | Striegler | C03C 17/02 219/443.1 |
| 2010/0304948 | A1 | 12/2010 | Comte et al. | |
| 2011/0226231 | A1* | 9/2011 | Siebers | C03C 3/087 126/211 |
| 2012/0067865 | A1 | 3/2012 | Siebers et al. | |
| 2015/0239771 | A1 | 8/2015 | Siebers et al. | |

FOREIGN PATENT DOCUMENTS

| | | |
|---|---|---|
| DE | 10309225 | 9/2004 |
| DE | 102008012602 | 9/2009 |
| DE | 102008050263 | 4/2010 |
| DE | 102009012952 | 9/2010 |
| EP | 0317022 | 5/1989 |
| EP | 1867613 | 12/2007 |
| EP | 2048781 | 4/2009 |
| JP | 2005093209 | 4/2005 |
| WO | 2008104563 | 9/2008 |
| WO | 2010040443 | 4/2010 |
| WO | 2010137000 | 12/2010 |

OTHER PUBLICATIONS

English Translation of the Written Opinion of the International Search Authority dated Feb. 22, 2012 corresponding to International Patent Application No. PCT/EP2011/071631, 7 pages.

English Translation of the International Preliminary Report on Patentability dated Jun. 12, 2013 corresponding to International Patent Application No. PCT/EP2011/071631, 7 pages.

* cited by examiner

DISPLAY DEVICE, IN PARTICULAR FOR COOKTOPS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

To improve user guidance, cooktops of modern glass ceramic cooking appliances are equipped with signal lamps or 7-segment displays. The cooktop itself is made of a transparent pigmented glass ceramic panel (substrate), which appears black when viewed from above. The signal lamps provide the user with information about the on state of the cooktop and/or individual cooking zones, the regulator position and also whether the cooking zone is still hot after being turned off. LED lamps are usually used as the lamp.

The available color spectrum for user information is severely limited because of the pigmentation of the glass ceramic cooktop and the very limited choice of colored LED displays. The standard is for these displays to appear in red or optionally orange, which is also the result of the pigmentation of the glass ceramic surface. DE 10 2008 050 263 describes the transmission characteristic of a glass ceramic cooktop which allows a permeability for blue light at approx. 450 nm in particular and thus allows an expanded color display capability. Different display options are conceivable on the basis of this glass ceramic. The coloration of the displays has also been expanded by expanding the transmission spectrum into the blue wavelength range. Because of the small number of variously colored LED displays, however, the number of colors visible for the user is still greatly limited even with this glass ceramic cooktop. For example, because of the transmission characteristic of the cooktop, a white LED would be perceived by the user as having a yellowish cast.

The object of the present invention is to provide a display device of the type described in the introduction, with which any predeterminable color impressions for the user on the front side of the glass ceramic can be implemented by signal lamps or display units in a simple, inexpensive and robust embodiment.

This object is achieved in a surprisingly simple way by arranging a compensation filter which corresponds to the desired color impression in the form of a color film or the like between the glass ceramic cooktop and the lamp, such that the shift in the chromaticity coordinate of the lamp due to the filter properties of the glass ceramic is corrected by the combination of the glass ceramic with such a compensation filter to yield the desired chromaticity coordinate.

Advantageous design variants of the invention are described in the dependent claims.

The present invention is explained in greater detail below with reference to the tables and figures, in which:

Table 1 shows the corner coordinates of fields in the CIE Norm Valent System CIE xyY, as shown in FIG. 3;

Table 2 shows the corner coordinates of additional fields in the CIE Norm Valent System;

Figure 7:
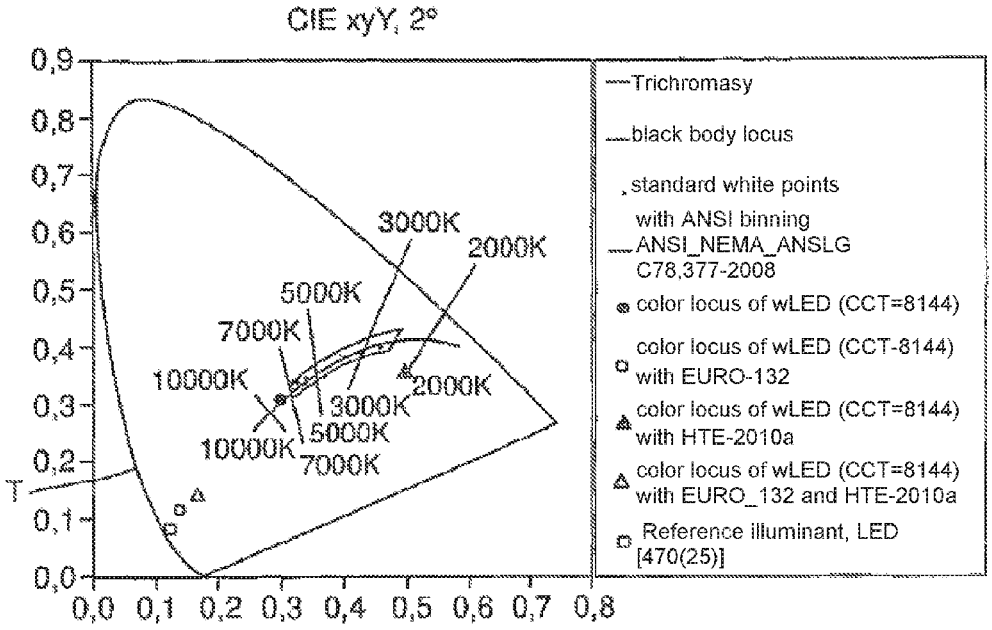
Figure 8:
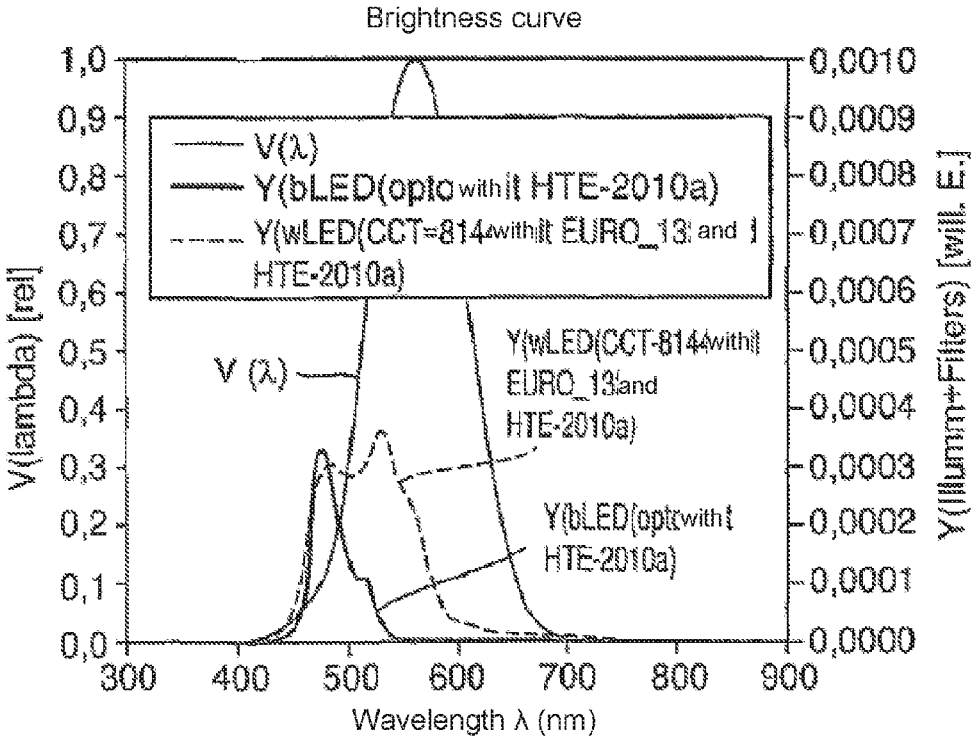
Figure 9:
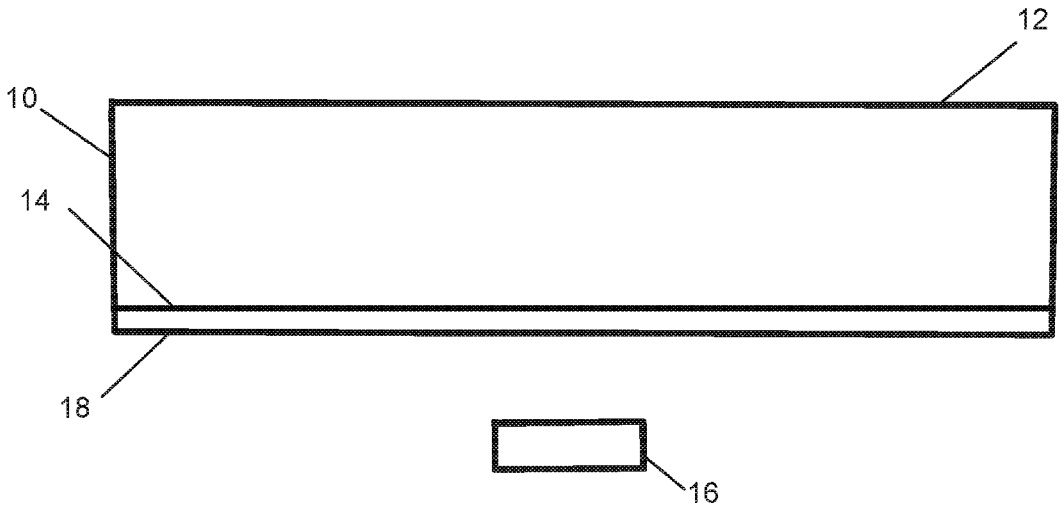

FIG. 7 shows the chromaticity coordinates of a blue LED and of a white LED with a blue filter, as observed directly and as observed through a glass ceramic of the Ceran Hightrans® eco type, FIG. 8 shows brightness spectra of the blue LED and of the white LED according to FIG. 7, as seen through Ceran Hightrans® eco, and FIG. 9 shows a display device, in particular for cooktops having a glass ceramic body 10, in particular a glass ceramic panel, forming a glass ceramic front side 12 and a glass ceramic back side 14, and having a lamp 16 arranged in the area of the glass ceramic back side, characterized in that an optical compensation filter 18 is arranged between the glass ceramic cooktop 10 and the lamp 16.

The total transmission of the substrate $\tau_{ges}(\lambda)$ [ges=total] is comprised of the transmissions of the glass ceramic $\tau_{GK}(\lambda)$ [GK=glass ceramic] and of the compensation filter $\tau_{KF}(\lambda)$ [KF=compensation filter] (eq. 1). The intensity distribution $i_{LE}(\lambda)$ of the lighting element is shifted through the total transmission spectra $\tau_{ges}(\lambda)$ to the intensity distribution $i_A(\lambda)$ of the display (eq. 2), as perceived by an observer on the display side (eq. 2).

$$\tau_{ges}(\lambda)=\tau_{KF}(\lambda)\cdot\tau_A(\lambda) \quad \text{eq. 1}$$

$$i_A(\lambda)=\tau_{ges}(\lambda)\cdot i_{LE}(\lambda) \quad \text{eq. 2}$$

The associated shift in the chromaticity coordinate can be represented in the CIE Norm Valent System CIExyY (CIE—Commision internationale de l'éclaireage [International Commission on Illumination]). (For the following description and the examples, the 1931 CIExyY version with a 2° observer will be used in the present patent specification.) The human eye is not a spectrally continuous light sensor but instead is composed of color receptors for limited red, green and blue spectral regions. Accordingly, the sensory perception of the L, M and K cones is similar with sensitivities in the red, green and blue spectra of light. Based on test series with test subjects, tristimulus functions $\bar{x}$, $\bar{y}$, $\bar{z}$ and their integrals X, Y, Z, have been defined in the CIE formalism; these can represent the entire color space that can be perceived by our eyes as a triplet of artificial primary colors through their combination. In this system, the $\bar{x}$ and $\bar{z}$ functions only correspond approximately to the L and K cone sensitivities. The $\bar{y}$ function is constructed to simulate the brightness perception during the day and corresponds almost to the M cone sensitivity. With eq. 3 and eq. 4, the perceived chromaticity coordinate is clearly described by the standardized values x and y, and Y is a measure of brightness. The CIExyY formalism describes primary light sources, optionally shining through absorbent media, whose light spectrum striking the eye is transformed into the standardized X, Y, Z CIE coordinates which then describe the chromaticity coordinate and the brightness of the primary light source, $$A = \frac{1}{N}\int \bar{a}(\lambda)\cdot\tau(\lambda)\cdot i(\lambda)\cdot d\lambda \text{ with} \quad \text{eq. 3}$$

$$A = X, Y, Z \text{ and } \bar{a} = \bar{x}, \bar{y}, \bar{z} \text{ with}$$

$$N = \int \bar{y}(\lambda)\cdot i(\lambda)\cdot d\lambda$$

$$x = \frac{X}{S}, y = \frac{Y}{S}, z = 1 - x - y \text{ with } S = X + Y + Z \quad \text{eq. 4}$$

Figure 1:
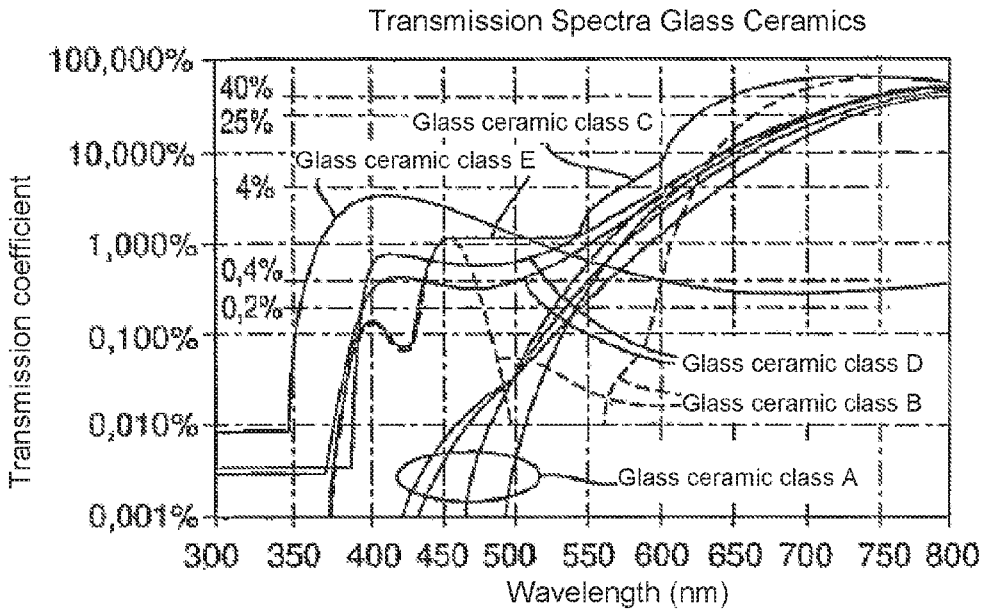
FIG. 1 shows typical transmission spectra of various glass ceramics for cooktops, as shown in FIG. 2.

The prerequisite for reaching a desired display chromaticity coordinate in the red to blue spectral range for an observer by means of a compensation filter and by means of a preferably standard commercial and inexpensive display lighting element is minimal transmission values of the substrate in the spectral range of all three L, M, K cones, for example, all three $\bar{x}$, $\bar{y}$, $\bar{z}$ CIE primary spectra. FIG. 1 shows typical transmission spectra represented by different types (classes) of glass ceramic. These include type A glass ceramic pigmented with vanadium (V), which is currently the most widely used glass ceramic (for example, CERAN SUPREMA®, CERAN HIGHTRANS®, KeraBlack®), glass ceramics with pigmentation by Co, Fe, Ni (type B, for example, CERAN COLOR®), by V, As and Fe (type C, China), by V, Fe (type D, for example, CERAN HIGHTRANS eco®, as described in DE 10 2008 050 263. The composition of these glass ceramics is herewith made part of the disclosure content of the present specification through this reference. This also includes those with pigmentation by $Ti^{3+}$ by means of reductive reformation (for example, ZnS reformation), i.e., type E.

Figure 3:
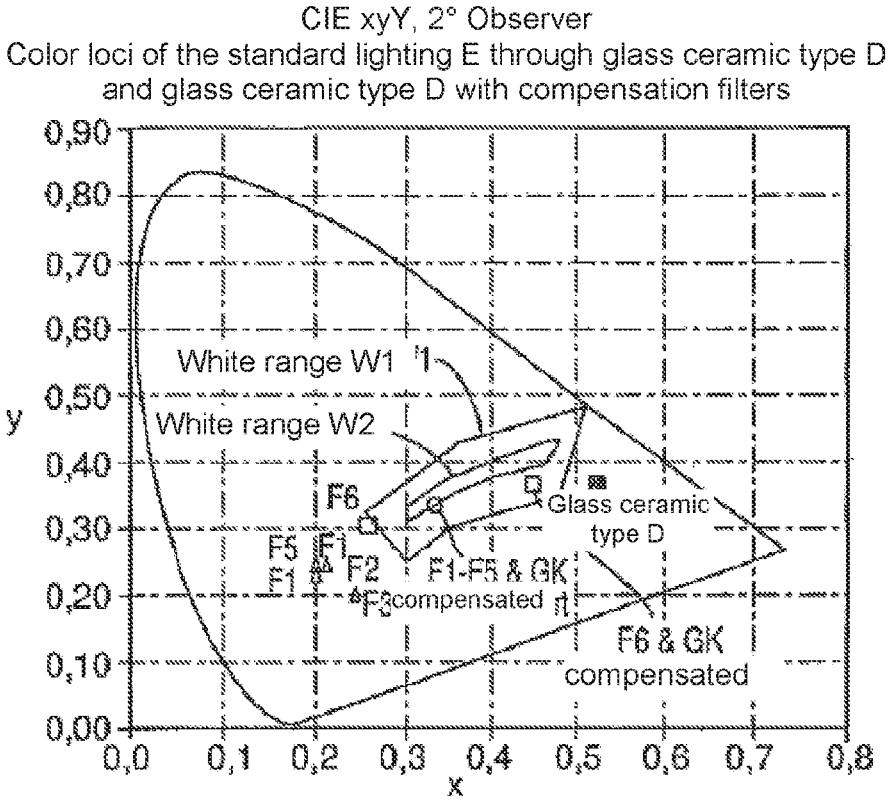
FIG. 3 shows a diagram of the chromaticity coordinates of standard illumination E through a certain glass ceramic D with and without a compensation filter in the CIE Norm Valent System for white compensation.

Creating sufficiently light color impressions in the blue to red spectral range through the glass ceramic on the display side, formed by the glass ceramic front side, using conventional commercial lamps (for example, LEDs) requires glass ceramics having an average transmission of >0.2%, preferably >0.4%, having a spectral range of 420-500 nm, 500-620 nm and 550-640 nm. As shown in FIG. 1, this condition is met by the more recent glass ceramic classes D and E, and, with some restriction, also class C. Class A glass ceramic, which was previously very popular, does not meet this condition. With this glass ceramic, shifts in the chromaticity coordinate over the entire visible spectral range such as those accomplished according to the present invention are impossible with conventional lamps and filters, and in particular there is also no white compensation. On the other hand, the spectral transmission must not be too high to prevent insight into the internal structure of the cooktop fields and to represent an aesthetically preferred nontransparent cooktop surface that is uniform in color and to do so without any additional aids such as opaque coatings on the bottom side. In the present case, this maximum transmission of the glass ceramic body is defined as being <40%, preferably <25% at 400 nm to 700 nm, and in addition is between 450 and 600 nm with an average of <4%. As FIG. 1 shows clearly, this second condition is satisfied by all the glass ceramic classes shown here, except for class C, which appears in practice to be transparent, to prevent insight into the interior of a cooktop. Another condition, i.e., a third condition, is derived from the feasibility of a color shift to a white color impression of a commercial lamp through a glass ceramic cooktop and a compensation filter that is not too expensive. To this end, the difference in transmission in the three spectral ranges of perception must not be too great. This is illustrated in FIG. 3. The chromaticity coordinates of the normal illumination through glass ceramics according to the present invention should lie within a limit curve G1, preferably a limit curve G2. Table 2 shows the corner coordinates with the limit curves G1 and G2.

If an observer perceives a light stimulus consisting of two light signals, which are situated side by side in space but do not appear resolved in space to the human eye and which are described by the intensity distribution of the light elements and by filter transmissions, then the perceived sensory perception is added up linearly (eq. 5) and the cursory chromaticity coordinate (x, y) lies on a straight line between the chromaticity coordinates $(x_1, y_1)$ and $(x_2, y_2)$ of the two light signals (eq. 6) in the CIExyY chromaticity diagram. In the specific case of equal intensities (eq. 7), (x, y) lies at the center between the chromaticity coordinates of the two light signals (eq. 8).

$$A = \frac{1}{N}\int \bar{a}(\lambda)\cdot(\tau_1(\lambda)\cdot i_1(\lambda) + \tau_2(\lambda)\cdot i_2(\lambda)) \ldots d\lambda = A_1(\tau_1, k_1 i) + A_1(\tau_2, k_2 i) \quad \text{Eq. 5}$$

with $i_1 = k_1 \cdot i$, $i_2 = k_2 \cdot i$, $k_1 + k_2 = 1$ $$x = k_1 x_1 + k_2 x_2 \quad \text{Eq. 6}$$

with $x_i = f(\tau_i, i)$, corresponding to y, z.

$$k_1 = k_2 = 1/2 \quad \text{Eq. 7}$$

$$x = \frac{x_1 + x_2}{2}, y = \frac{y_1 + y_2}{2}, z = \frac{z_1 + z_2}{2} = 1 - x - y. \quad \text{Eq. 8}$$

This linear relationship is also known from color diagrams of image displays, such as CRT or LCD monitors, for example, in which possible perceptible chromaticity coordinates in the CIExyY diagram lie in a triangle between the chromaticity coordinates of the three primary colors of the display device, which is usually an RGB color space or in a color polygon with more than three primary colors, where the chromaticity coordinate is calculated from the linear combination of three or more primary intensities according to (eq. 6).

In the application of two filters arranged one after the other according to the invention, a substrate (for example, a glass ceramic) and a compensation filter, the relationship is no longer linear, as illustrated by eq. 9 in comparison with eq. 5. For example, the transmission spectra of the glass ceramic $\tau_{GK}(\lambda)$ and of the compensation filter $\tau_{KF}(\lambda)$ may be used in eq. 9 for $\tau_1(\lambda)$ and $\tau_2(\lambda)$ from eq. 1, for example.

$$A_{12} = \frac{1}{N}\int \bar{a}(\lambda)\cdot\tau_1(\lambda)\cdot\tau_2(\lambda)\cdot i(\lambda) \ldots d\lambda \quad \text{Eq. 9}$$

The chromaticity coordinate of the light element through the filters arranged one after the other is no longer necessarily on a straight line between the chromaticity coordinates of the light element through the individual filters. Conversely, this leads to the phenomenon that the same shared chromaticity coordinate of a light element through a glass ceramic, which has been compensated according to the invention, can be achieved with different compensation filters, such that the chromaticity coordinate of the light element through the individual compensation filters need not be identical, depending on the spectral distribution. FIG. 3 shows the chromaticity coordinates of normal light individually through a glass ceramic of type D and individually through different compensation filters F1-F5, each of which makes the standard light appear at the same overall chromaticity coordinate when arranged in combination with the glass ceramic one after the other. In the example shown here the color filters are designed so that the overall chromaticity coordinate for the observer is at the achromatic point E (gray point or white point E).

With a color filter according to the invention, it is thus possible, as already described, to again compensate for the shift in the original chromaticity coordinate of the lamp through the pigmented substrate, and specifically to yield a white chromaticity coordinate. A further application according to the invention is to shift the chromaticity coordinate of the lamp on the display side of the substrate to a desired chromaticity coordinate, which is different from the original chromaticity coordinate of the lamp. The combined shifts in the chromaticity coordinate due to the substrate and the filter do not compensate one another here as intended. It is thus possible to generate a chromaticity coordinate that cannot be represented by the available fixed wavelengths of commercial LEDs, for example, a chromaticity coordinate that is located between a yellow LED and an orange LED. This is advantageous in identification, differentiation and marketing of product lines, for example. In addition, lighting elements can be constructed uniformly and thus with a cost advantage using a variety of lamps that are not monochromatic but instead are colored lamps which emit over a broad spectral range (for example, white LEDs, fluorescent tubes). By using different color filters according to the invention, different chromaticity coordinates for different product lines or the same chromaticity coordinates of one product line may be created in combination with substrates of different colors. Chromaticity coordinate shifts and compensations can be used in particular for lamps of a broad band spectrally, such as white LEDs, fluorescent tubes or mixed colors of combined single-color LEDs, for example, RGB LEDs. Single-color and almost monochromatic lamps, for example, red, blue and green LEDs, when used as a single color, do not usually experience any marked shift in chromaticity coordinate due to filters.

Compensating the chromaticity coordinate of a lamp toward white according to the present invention does not mean hitting precisely the achromatic point E. Instead the eye tolerates a wide chromaticity coordinate range as a white impression. This also depends on the chromaticity coordinates of the surrounding surfaces such as a reddish black cooktop surface, among other things. Thus the chromaticity coordinate of the standard light source E is still perceived as white through a filter F6 and the type D glass ceramic (see FIG. 3) in the environment of the cooktop, although it is already perceived as definitely reddish in a direct comparison with the chromaticity coordinate E. Therefore the goal according to the invention for white compensation of a lamp of any color is to achieve a chromaticity coordinate which is within the limits of the white range W1, preferably the white range W2. The white range W2 surrounds the white fields 1A, . . . , 1D, . . . , 8D, which are defined in ANSI (ANSI binning) and are typically used by LED manufacturers to characterize the chromaticity coordinates of their white LEDs. This range corresponds to color temperatures of 2580K to 7040K (CCT, color correlated temperature), in accordance with the white impression from cold white to warm white. The corner points of the white areas W1 and W2 in FIG. 3, which are defined according to the invention, are listed in Table 1.

Figure 5:
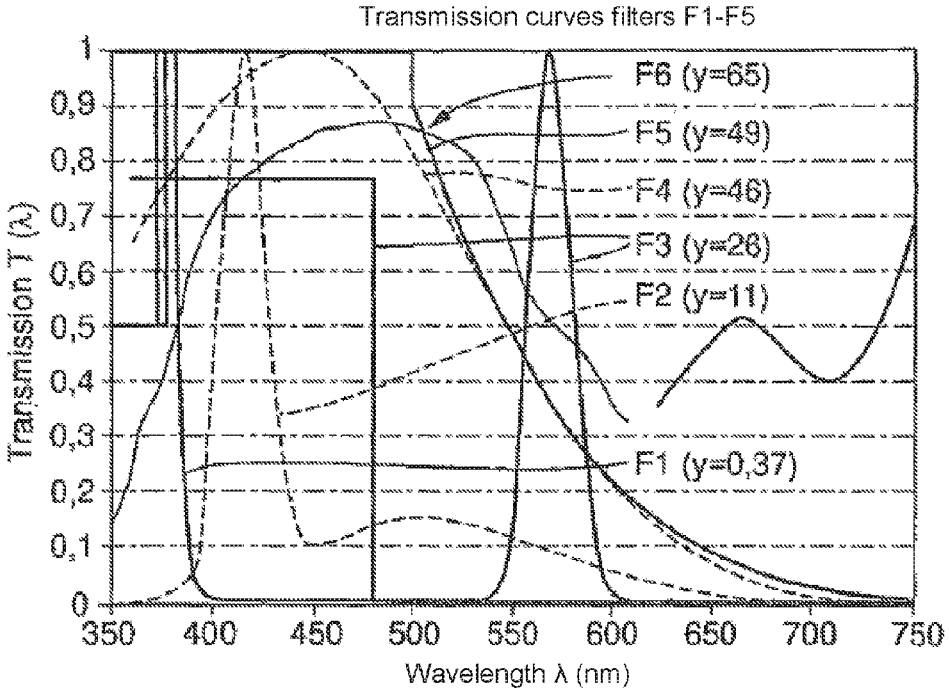
FIG. 5 shows a diagram of transmission curves of compensation filters $F_1$ through $F_6$, optimized for compensation of the standard light source E and the type D glass ceramic.

According to the present invention, the chromaticity coordinate compensation is not limited to the exemplary filters F1-F5 according to FIG. 5 or the standard light source E. In one application, commercially available and inexpensive lamps, for example, white LEDs are preferably used. Lamps of other colors that are not monochromatic, for example, fluorescent tubes or also for example, a combination of red, green and blue LEDs (RGB lamps) which are set at a fixed chromaticity coordinate as background lighting of LCD displays, for example, or which control a color display on a screen may also be used for compensation by means of suitably designed compensation filters on the display side of the cook field to the original chromaticity coordinate of the lamps or specifically to generate a white color impression or any other color impression.

Figure 4:
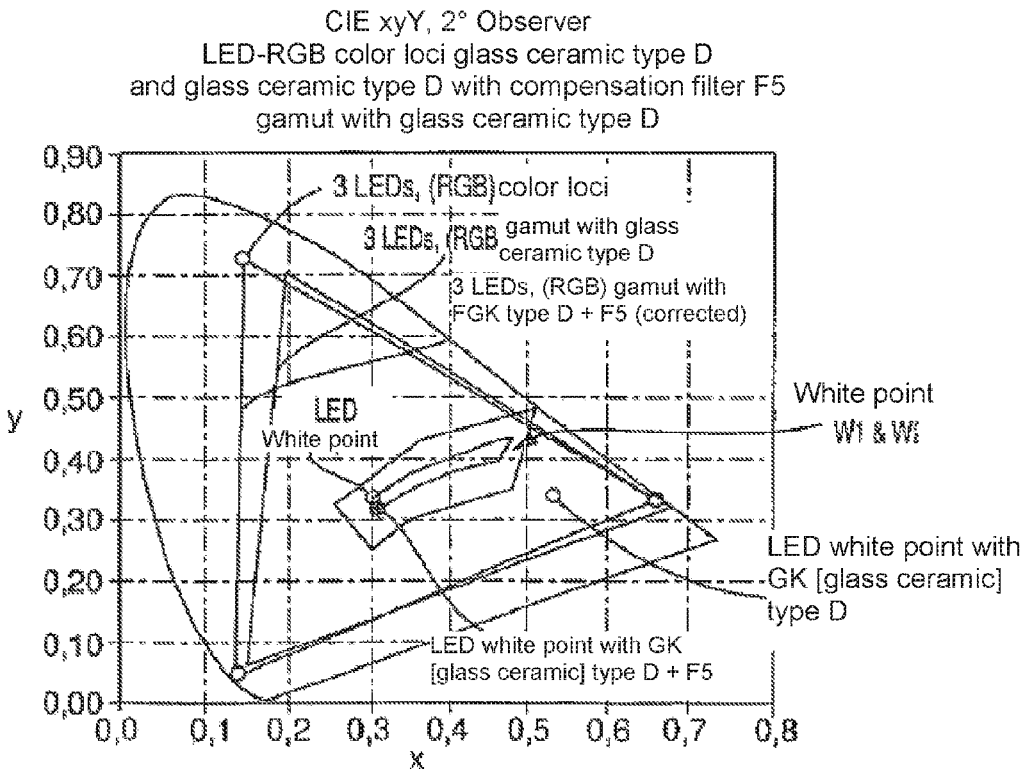
FIG. 4 shows a diagram of chromaticity coordinates of an LED-RGB lamp (RGB gamut) through a certain type D glass ceramic with and without a compensation filter in the CIE Norm Valent System.

FIG. 4 shows one example of a correction of an RGB lamp. An RGB lamp spans a triangular color space (gamut) between the LED CIExyY chromaticity coordinates which can be represented in the CIExyY color space. When observed through a type D glass ceramic, this gamut is shifted toward the red but then the gamut is shifted back by the additional filter F5 to almost coincide with the original gamut between the LEDs (without glass ceramic and compensation filter). Accordingly, the white point that is set for the RGB lamp (standard light D65 here, for example) when observed through the glass ceramic is shifted toward the red and again is shifted back to almost correspond with the original chromaticity coordinate by means of the filter F5. This correction of the white point is not exact here because the filter F5 has been optimized for a standard light E, and nonlinearities with the spectra of the LEDs also play a role (cf. eq. 9).

Filters with a high brightness of the light passing through are advantageous in general. Since the brightness impression of the human eye is scaled with the green spectrum and/or the green tristimulus function, such filters which have the highest possible transmission in the green spectral range are preferred according to the invention. This is manifested in the fact that the brightness of these in transmission through the filter reaches almost Y=100 with a light source (Y=100).

Figure 6:
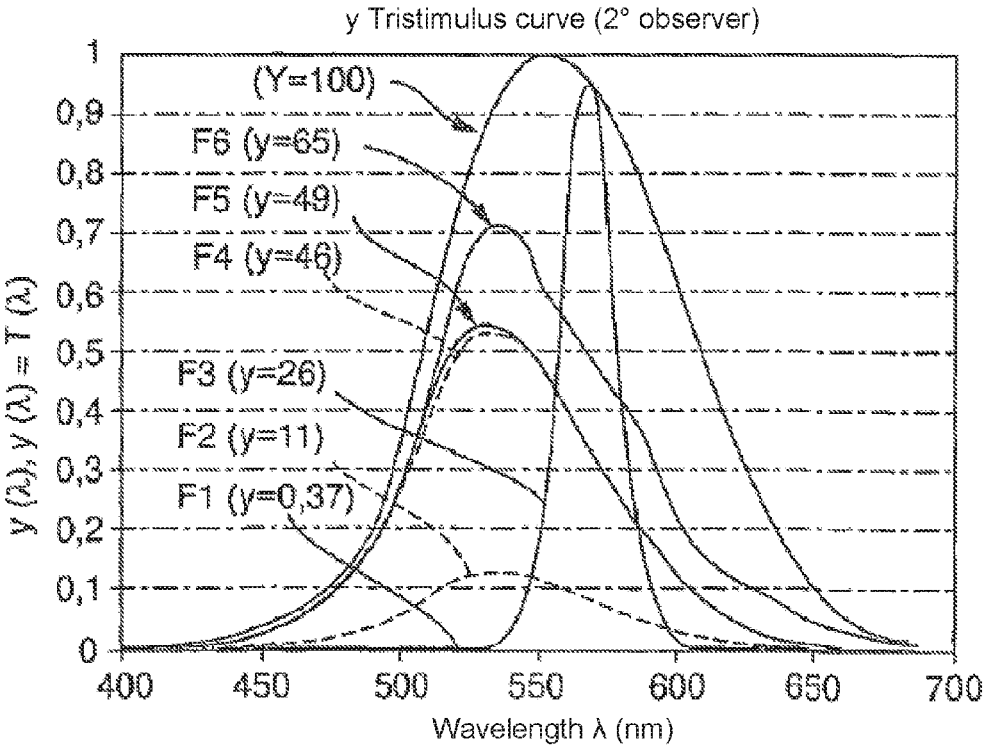
FIG. 6 shows the y tristimulus and the Y values of filters $F_1$ through $F_6$ according to FIG. 6.

It has been found that the filters F1-F6 discussed here for chromaticity coordinate compensation of the standard light source E beneath a type D glass ceramic will transmit almost uniformly beneath a green wavelength (high-pass frequency filter), for example, filters F4-F6 in FIG. 5 are advantageous in comparison with those in the brightness impression which have a high transmission only in the limited blue and green spectral ranges in a targeted manner, for example, filters F1-F3 in FIG. 5. According to the invention, compensation filters with Y>10 (based on standard light E), preferably Y>40 (based on standard light E) are advantageous for white point compensation under type D glass ceramics of white lamps. FIG. 6 shows the integrative Y values of the filters F1-F6 under the green tristimulus function.

This rule, i.e., a high transmission in the green range, applies in general for combinations of any lamps and filters.

The compensation filter F1 here is a special solution in which its transmission $T_{KF}$ and the transmission $T_{GK}$ of the pigmented glass ceramic cooktop are compensated to a constant value $T_E$ which is not dependent on the wavelength (eq. 10). The intensity spectrum $I_{LE}(\lambda)$ of the lamp is then weakened by a constant value $T_E$ to the intensity spectrum $I_A$ which appears on the display side (eq. 11). However, the standard light source E achieves a brightness value of only Y<1 through the filter F1.

$$\tau_E=\tau_{KF}(\lambda)\cdot\tau_{GK}(\lambda)=\text{konst.} \quad \text{eq. 10}$$

$$i_{A0}(\lambda)=\tau_E\cdot i_{LE}(\lambda) \quad \text{eq. 11}$$

konst.=const.

Color filter films must be transparent enough for this use as compensation filters and must be thermally stable. The compensation filter F6 is an example of a color filter that is available commercially. This film CT113 no. 11383 from the company ASLAN has very good results in this regard and has thermal stability up to 80° C. Films from the company Lee or Q-Max have an increased thermal stability up to 185° C. and are therefore preferred for use here.

According to the invention, chromaticity coordinate compensation is not limited to a white chromaticity coordinate. Any desired chromaticity coordinate may be adjusted with a corresponding compensation filter, for example, brand-specific colors for displays or company logos or different chromaticity coordinates for user-friendly differentiation of warnings, instructions or user aids or different chromaticity coordinates for different power levels on cooktops. This may be used in a variety of examples which serve to facilitate user guidance, status displays or various ambients of decorative lighting.

Figure 2:
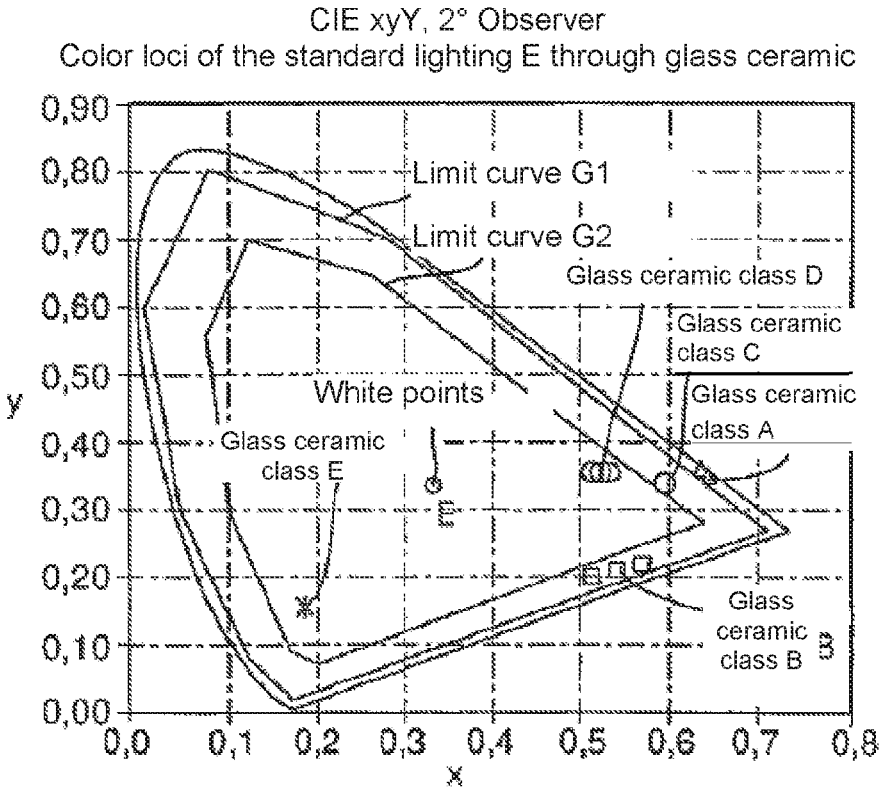
FIG. 2 shows a diagram of the chromaticity coordinates of the standard illumination E through various glass ceramics in the CIE Norm Valent System.

In addition, it has been found that commercial colored LEDs, in particular those in the blue or red color spectrum, are visible with only restricted brightness when observed through variously pigmented glass ceramics or other transparent pigmented materials. This is due to the fact that the human eye has only a low brightness perception in the blue and red spectral ranges in contrast with the green spectral range. Experience has shown that a blue display, for example, can also be created by means of a white lamp, in particular a white LED, and a blue color filter which has a lower color saturation in comparison with a blue LED but advantageously has a much higher brightness. This is illustrated in FIG. 7 in the CIExyY diagram (2° observer) with chromaticity coordinates (x, y) calculated according to eq. 4. The chromaticity coordinate of a blue 470 nm LED (LED [470 (25)]) is situated close to the trichromacy curve T (square gray symbol, color saturation=0.98). The chromaticity coordinate of a white display (CCT=8144) (7-segment LED, opto-devices model OS39D3BWWA), black circle, and this white light through a CERAN HIGHTRANS® eco sample with a black triangular symbol is represented likewise. Chromaticity coordinates near the trichromacy curve convince us of a high color saturation while chromaticity coordinates on an imaginary line approaching the neutral point (x=0.33, y=0.33) (standard light E—see FIG. 2) have an even lower color saturation, the closer they are to the neutral point. As an example here, the chromaticity coordinate of this aforementioned white display is shown with a blue compensation filter in the form of a blue color compensation film (EURO filter no. 132, "medium blue"), i.e., in one case, the chromaticity coordinate of the light through the film 132 (round gray symbol) and the chromaticity coordinate of this white light through the film and a CERAN HIGHTRANS® eco sample (triangular gray symbol, color saturation=0.72). The resulting chromaticity coordinate of the CERAN HIGHTRANS® eco sample is almost on an imaginary line 470 nm LED—neutral point (gray square symbol—standard light E). All the points on this line have the same hue but the color impression appears brighter toward the neutral point (declining color saturation). This white display with a blue color film creates the same hue in comparison with the blue LED display but does so with a brighter color impression through the CERAN HIGHTRANS® eco sample. This chromaticity coordinate has approximately the same limit wavelength as the spectrally purer blue LED close to the trichromacy curve. The greater brightness is explained by the additional components in the emission spectrum, in particular the green components, for which the human eye has a greater sensitivity in comparison with the almost monochromatic blue emission spectrum of a blue LED. This is shown clearly in FIG. 8 on the basis of brightness spectra. The brightness spectra are the wavelength-dependent function below the integral in eq. 9, multiplication of the transmission spectra, of the light spectrum and of the V(λ) curve. The V(λ) curve describes the brightness perception of the human eye. The brightness spectra of the blue 470 nm LED mentioned above and the white LED display with blue compensation film (EURO filter no. 132), both observed through CERAN HIGHTRANS® eco, are shown as an example. The area under the curves describes the perceived brightness. At approximately the same intensity in the blue spectral range (470 nm), the spectrum of the white display with the blue filter (filter that filters the blue light components out of the spectrum of visible light) has an additional component in the green (and red) spectral range which creates the greater brightness impression. This application according to the invention is not limited to the blue spectral range. It is possible with this method to implement displays with all spectral colors, advantageously creating chromaticity coordinates that appear brighter or even creating desired chromaticity coordinates having a lower color saturation in comparison with those of single-color LEDs and correcting the shift in chromaticity coordinate of a pigmented glass ceramic body, for example, in comparison with almost monochromatic displays with single-color LEDs.

Within the scope of the invention, masking of films is also conceivable. This masking also allows a sharp delineation of the signal field and shielding of stray light as well as a display of characters, symbols or fonts, which are visible for the user when the lighting is on and cannot be seen by the user when the lighting is off. Even the position of these marks/logos cannot be discerned when the lighting is off, so the fine, single-color appearance of the glass ceramic surface is retained for the user. This effect is known as the "deadfront effect" and is often desired by designers because it significantly enhances the cooking appliance in its overall aesthetics. Since the masking is done directly in the film (for example, through a second suitably printed black film), this system is much more flexible to use than masking printed directly on the back of the glass ceramic cooktop, for example.

This deadfront effect is possible only with considerable extra effort with the transparent glass ceramic cooktops known especially in Japan. Because of the high transparency of these cooktops, displays or lamps are visible directly and/or clearly, which is partially perceived as annoying. In contrast with these transparent cooktops, the cooktops with dark pigmentation are also combined with high-performance radiant heating elements, so that the glass ceramic cooktops having radiant heating elements and/or halogen heating elements are definitely upgraded in user guidance with the method proposed here. In addition to the colored film preferably to be used as proposed here, including the optional masking, a printed color coating on the bottom side of the cooktop is also conceivable. It is also conceivable to glue the loose film to the bottom side of the glass ceramic and/or to glue a masked film to the bottom side of the glass ceramic. Due to the sharp delineation by means of masking, image definition on the top side is possible without visually interfering distortion of fine lines and characters when using glass ceramic cooktops which usually have a nubby bottom side. This is another definite advantage in comparison with the known printed masking on a nubby bottom side. Due to the direct printing of the nubby bottom side there is distortion, which can be very annoying, so that only very large windows and symbols can be displayed. The cooktop is usually 4 mm thick, but in commercial applications, it may be up to 6 mm thick. To increase the color intensity and/or luminous intensity, it is also conceivable to use cooktops having a reduced thickness of 3 mm, for example.

In addition to the main field of applications for illumination with single LEDs or 7-segment displays as shown here, the system is of course also suitable for any other light source and form of display; for example, halogen lamps, glow sticks, fiber optics or fluorescent tubes may also be used as the light source. In addition to light spots or 7-segment displays, bar displays or illuminated labels for identifying cooking zones or for marking or illumination of larger cooking areas or borders are also conceivable. In addition, chromaticity coordinate compensation or shifts according to the invention may also be used for background lighting of alphanumeric or graphic displays, for example, LCD displays. In addition to the preferred use in glass ceramic cooking appliances, this system may also be used in the panel area of baking ovens or Domino cooking surfaces, including grill plates. For example, fireplace claddings made of glass ceramic are also known. With these fireplace claddings, illumination with the proposed system to improve user convenience is also possible. The cooktop may be designed to be flat or curved or to have a complex shape. Gas burners, induction coils or radiant heating elements and/or halogen heating elements are conceivable as the heating source for the cooking areas.

TABLE 1

| W1 | | W2 | |
|---|---|---|---|
| X | Y | X | Y |
| 0.3 | 0.25 | 0.3068 | 0.3113 |
| 0.26 | 0.32 | 0.3028 | 0.3304 |
| 0.37 | 0.43 | 0.3205 | 0.3481 |
| 0.51 | 0.48 | 0.3207 | 0.3462 |
| 0.48 | 0.35 | 0.3376 | 0.3616 |
| 0.35 | 0.3 | 0.3551 | 0.376 |
| | | 0.3548 | 0.3736 |
| | | 0.3736 | 0.3874 |
| | | 0.4006 | 0.4044 |
| | | 0.3996 | 0.4015 |
| | | 0.4299 | 0.4165 |
| | | 0.4562 | 0.426 |
| | | 0.4813 | 0.4319 |
| | | 0.4593 | 0.3944 |
| | | 0.4147 | 0.3814 |
| | | 0.3889 | 0.369 |
| | | 0.3898 | 0.3716 |
| | | 0.367 | 0.3578 |
| | | 0.3512 | 0.3465 |
| | | 0.3515 | 0.3487 |
| | | 0.3366 | 0.3369 |
| | | 0.3222 | 0.3243 |
| | | 0.3221 | 0.3261 |

TABLE 2

| Limit curve G1 | | Limit curve G2 | |
|---|---|---|---|
| X | Y | X | Y |
| 0.71 | 0.27 | 0.64 | 0.28 |
| 0.17 | 0.02 | 0.20 | 0.07 |
| 0.12 | 0.08 | 0.17 | 0.09 |
| 0.05 | 0.30 | 0.10 | 0.30 |
| 0.01 | 0.60 | 0.08 | 0.56 |
| 0.08 | 0.81 | 0.12 | 0.70 |
| 0.28 | 0.70 | 0.26 | 0.65 |
| 0.71 | 0.27 | 0.64 | 0.28 |

The invention claimed is:

1. A display device for cooktops, comprising:

a colored glass ceramic panel forming a glass ceramic front side and a glass ceramic back side, the glass ceramic panel having a mean transmission greater than 0.2% for each of the spectral ranges of 420-500 nm, 500-620 nm, and 550-640 nm, and the glass ceramic panel having a maximum transmission less than 40% in the *entire* spectral range of 400 to [750] *700* nm and less than an average of 4% in the *entire* spectral range of 450 to 600 nm;

a lamp arranged in an area of the glass ceramic back side, the lamp being either a combination of at least a blue LED, a green LED, and red LED or being a white lamp; and an optical compensation filter arranged between the glass ceramic front side and the lamp with the glass ceramic panel and the compensation filter forming two filters arranged one after another such that a shift in a standard chromaticity coordinate x, y in the CIE Norm Valent System CIExyY (CIE: Commision Internationale de l'Eclaireage, 1931, 2° observer) of the lamp due to filter properties of the glass ceramic panel is corrected by a combination of the glass ceramic panel and the compensation filter to yield a desired chromaticity coordinate x, y in the CIE Norm Valent System CIExyY (CIE: Commision Internationale de l'Eclaireage, 1931, 2° observer).

2. The display device according to claim 1, wherein the mean transmission is greater than 0.4% for each of the spectral ranges of 420-500 nm, 500-620 nm, and 550-640 nm.

3. The display device according to claim 1, wherein the maximum transmission is less than 25% in the spectral range of 400 to 750 nm.

4. The display device according to claim 1, wherein the glass ceramic panel causes the standardized chromaticity coordinate of the lamp to appear on or above the limit curve (G1) which is determined by the following coordinates in transmission through the same glass ceramic body in the CIE Norm Valent System CIExyY:

| Limit curve G1 | |
|---|---|
| x | Y |
| 0.71 | 0.27 |
| 0.17 | 0.02 |
| 0.12 | 0.08 |
| 0.05 | 0.30 |
| 0.01 | 0.60 |
| 0.08 | 0.81 |

-continued

| Limit curve G1 | |
|---|---|
| x | Y |
| 0.28 | 0.70 |
| 0.71 | 0.27. |

5. The display device according to claim 4, wherein the glass ceramic panel causes the standardized chromaticity coordinate of the lamp to appear on or above the limit curve (G2) which is determined by the following coordinates in transmission through same glass ceramic body in the CIE Norm Valent System CIExyY:

| Limit curve G2 | |
|---|---|
| x | Y |
| 0.64 | 0.28 |
| 0.20 | 0.07 |
| 0.17 | 0.09 |
| 0.10 | 0.30 |
| 0.08 | 0.56 |
| 0.12 | 0.70 |
| 0.26 | 0.65 |
| 0.64 | 0.28. |

6. The display device according to claim 1, wherein light whose chromaticity coordinate is different from the original chromaticity coordinate of the lamp is created on the display side formed by the glass ceramic front side.

7. The display device according to claim 1, wherein light whose chromaticity coordinate is compensated from the same original chromaticity coordinate of the lamp is created on the display side formed by the glass ceramic front side.

8. The display device according to claim 1, wherein light whose chromaticity coordinate in the CIE Norm Valent System CIExyY is in or on the limit of the white range (W1) is created on the display side formed by the glass ceramic front side, which is determined by the following coordinates:

| W1 | |
|---|---|
| x | y |
| 0.3 | 0.25 |
| 0.26 | 0.32 |
| 0.37 | 0.43 |
| 0.51 | 0.48 |
| 0.48 | 0.35 |
| 0.35 | 0.3. |

9. The display device according to claim 8, wherein light whose chromaticity coordinate in the CIE Norm Valent System CIExyY is in or on the limit of the white range (W2) is created on the display side formed by the glass ceramic front side, which is determined by the following coordinates:

| W2 | |
|---|---|
| x | y |
| 0.3068 | 0.3113 |
| 0.3028 | 0.3304 |
| 0.3205 | 0.3481 |
| 0.3207 | 0.3462 |
| 0.3376 | 0.3616 |
| 0.3551 | 0.376 |
| 0.3548 | 0.3736 |
| 0.3736 | 0.3874 |
| 0.4006 | 0.4044 |
| 0.3996 | 0.4015 |
| 0.4299 | 0.4165 |
| 0.4562 | 0.426 |
| 0.4813 | 0.4319 |
| 0.4593 | 0.3944 |
| 0.4147 | 0.3814 |
| 0.3889 | 0.369 |
| 0.3898 | 0.3716 |
| 0.367 | 0.3578 |
| 0.3512 | 0.3465 |
| 0.3515 | 0.3487 |
| 0.3366 | 0.3369 |
| 0.3222 | 0.3243 |
| 0.3221 | 0.3261. |

10. The display device according to claim 1, wherein the white lamp is a white LED or a fluorescent tube.

11. The display device according to claim 1, wherein the white lamp emits white light and the compensation filter is designed so that colored light with a color saturation between 0.99 and 0.5 is emitted on the glass ceramic front side.

12. The display device according to claim 1, wherein the compensation filter has a brightness value of greater than 10 for transmitting standard light E in the CIExyY system (1931, 2° observer).

13. The display device according to claim 12, wherein the brightness value is greater than 40.

14. The display device according to claim 1, wherein the compensation filter is a color filter film.

15. The display device according to claim 14, wherein the color filter film has a thermal stability in the range of greater than or equal to 80° C.

16. The display device according to claim 14, wherein the color filter film has a thermal stability in the range of greater than or equal to 150° C.

17. The display device according to claim 14, wherein the color filter film has a mask.

18. The display device according to claim 1, wherein the compensation filter is printed on the glass ceramic panel.

19. The display device according to claim 1, wherein the glass ceramic panel has a thickness in the range between 3 and 6 mm.

* * * * *